United States Patent
Dai (10) Patent No.: US 10,419,212 B2
(45) Date of Patent: Sep. 17, 2019

(54) METHODS, SYSTEMS, APPARATUSES, AND DEVICES FOR SECURING NETWORK COMMUNICATIONS USING MULTIPLE SECURITY PROTOCOLS

(71) Applicants: Alibaba Group Holding Limited, Grand Cayman (KY); Jun Dai, Hangzhou (CN)

(72) Inventor: Jun Dai, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/563,747

(22) PCT Filed: Mar. 15, 2016

(86) PCT No.: PCT/CN2016/076413
§ 371 (c)(1),
(2) Date: Oct. 2, 2017

(87) PCT Pub. No.: WO2016/155495
PCT Pub. Date: Oct. 6, 2016

(65) Prior Publication Data
US 2018/0083777 A1    Mar. 22, 2018

(30) Foreign Application Priority Data
Apr. 2, 2015  (CN) .......................... 2015 1 0155553

(51) Int. Cl.
*H04L 29/06* (2006.01)
*H04L 9/08* (2006.01)
(Continued)

(52) U.S. Cl.
CPC ........ *H04L 9/0838* (2013.01); *G06F 16/2237* (2019.01); *G06F 21/42* (2013.01);
(Continued)

(58) Field of Classification Search
CPC ... H04L 9/0838; H04L 63/205; H04L 63/061; G06F 21/42; H04W 12/04; H04W 12/02
See application file for complete search history.

(56) References Cited

U.S. PATENT DOCUMENTS 6,744,774 B2 * 6/2004 Sharma ................... H04L 45/02
370/401
6,816,455 B2   11/2004 Goldberg et al.
(Continued)

FOREIGN PATENT DOCUMENTS

CN    101163145 A    4/2008
CN    102420740 A    4/2012
(Continued)

OTHER PUBLICATIONS

Kramer et al., "IPACT a dynamic protocol for an Ethernet PON (EPON)", IEEE Communications Magazine ( vol. 40 , Issue: 2 , Feb. 2002) (Year: 2002).*
(Continued)

*Primary Examiner* — Morshed Mehedi
(74) *Attorney, Agent, or Firm* — James J. DeCarlo; Greenberg Traurig, LLP (57) ABSTRACT

The disclosed embodiments describe a data exchange method, apparatus, and device. In one embodiment, the method is applied to a sender device performing data exchange with a receiver device and comprises: negotiating a default protocol for the data exchange with the receiver device; obtaining a dynamic protocol according to the default protocol; generating an exchange data packet according to the dynamic protocol and to-be-transmitted data; and transmitting the exchange data packet to the receiver device, so that the receiver device receives the exchange data packet using the dynamic protocol generated through the default protocol. By means of the disclosed embodiments, a dynamic protocol is generated through a negotiated default (Continued)

protocol between a sender and a receiver; and data exchange is performed based on the dynamic protocol. Because the dynamic protocol can be dynamically generated when a need for data exchange arises, a malicious third party stealing can be effectively prevented in a communication process of data exchange, thereby enhancing data exchange security.

18 Claims, 10 Drawing Sheets

(51) Int. Cl.
    *G06F 16/22*     (2019.01)
    *H04L 9/32*     (2006.01)
    *H04W 12/02*     (2009.01)
    *H04W 12/04*     (2009.01)
    *H04W 12/06*     (2009.01)
    *G06F 21/42*     (2013.01)

(52) U.S. Cl.
    CPC .......... *H04L 9/0819* (2013.01); *H04L 9/3226* (2013.01); *H04L 63/0428* (2013.01); *H04L 63/061* (2013.01); *H04L 63/0853* (2013.01); *H04L 63/205* (2013.01); *H04W 12/02* (2013.01); *H04W 12/04* (2013.01); *H04W 12/06* (2013.01)

(56) References Cited

U.S. PATENT DOCUMENTS

| | | | |
|---|---|---|---|
| 7,054,332 B2* | 5/2006 | Favichia | H04L 69/24 370/466 |
| 7,194,544 B2 | 3/2007 | Natarajan et al. | |
| 7,243,157 B2 | 7/2007 | Levin et al. | |
| 7,526,640 B2 | 4/2009 | Bazan | |
| 7,664,023 B2 | 2/2010 | Levin et al. | |
| 8,127,130 B2 | 2/2012 | Ellis | |
| 8,510,791 B2 | 8/2013 | Boyce | |
| 8,582,749 B2 | 11/2013 | Strathmeyer et al. | |
| 8,887,293 B2 | 11/2014 | Cooper et al. | |
| 9,537,899 B2* | 1/2017 | Cox | H04L 63/205 |
| 9,674,312 B2 | 6/2017 | Kashou et al. | |
| 2004/0107345 A1* | 6/2004 | Brandt | G05B 15/02 713/171 |
| 2006/0218636 A1 | 9/2006 | Chaum | |
| 2007/0032255 A1 | 2/2007 | Koo et al. | |
| 2008/0288576 A1 | 11/2008 | Carlson et al. | |
| 2009/0067421 A1 | 3/2009 | Linden | |
| 2009/0323703 A1 | 12/2009 | Bragagnini et al. | |
| 2011/0307305 A1 | 12/2011 | Kohli et al. | |
| 2014/0029493 A1* | 1/2014 | Vos | H04L 67/2823 370/310 |
| 2014/0304785 A1* | 10/2014 | Kafle | H04L 63/12 726/5 |
| 2018/0152484 A1 | 5/2018 | Cox et al. | |

FOREIGN PATENT DOCUMENTS

| | | |
|---|---|---|
| CN | 103026389 A | 4/2013 |
| CN | 103858389 A | 6/2014 |
| CN | 104137511 A | 11/2014 |

OTHER PUBLICATIONS

International Search Report to corresponding International Application No. PCT/CN2016/076413 dated Jun. 12, 2016 (2 pages).

* cited by examiner

METHODS, SYSTEMS, APPARATUSES, AND DEVICES FOR SECURING NETWORK COMMUNICATIONS USING MULTIPLE SECURITY PROTOCOLS

CROSS-REFERENCE TO RELATED APPLICATIONS

This application claims the priority of Chinese patent application No. 201510155553.9, filed on Apr. 2, 2015 and entitled "Data Exchange Method, Apparatus and Device", and PCT Application No. PCT/CN2016/076413, titled "Data Exchange Method, Apparatus and Device" filed on Mar. 15, 2016, the disclosure of each hereby incorporated by reference in their entirety.

BACKGROUND

Technical Field

The disclosure relates to the field of securing network communications technologies, and in particular, to methods, systems, devices, and apparatuses for securing network communications using a dual-protocol security mechanism.

Description of the Related Art

With the coming of the big data era, massive amounts of data exchange between different fields or different services may be involved when various services are carried out based on the Internet. In current systems, exchange devices corresponding to different services may exchange data with one another based on a File Transfer Protocol (FTP). During the FTP-based data exchange, a data sender usually sets an account and a password, and shares the account and the password with a data receiver; after the data sender uploads the exchange data to an FTP server, the data receiver can request to exchange data from the FTP server based on the obtained account and password. However, since the data sender and the data receiver directly share the account and the password set by one party, the account and the password may be easily stolen by a malicious third party during use, leading to a lower security level in exchanging data.

BRIEF SUMMARY

The disclosure provides a data exchange method, apparatus, and device so as to solve the existing problem that data exchange has a lower security level.

According to a first aspect of embodiments of the disclosure, a data exchange method is provided, wherein the method is applied to a sender device performing data exchange with a receiver device, the method comprising: negotiating a default protocol for the data exchange with the receiver device; obtaining a dynamic protocol according to the default protocol; generating an exchange data packet according to the dynamic protocol and to-be-transmitted data; and transmitting the exchange data packet to the receiver device, so that the receiver device receives the exchange data packet using the dynamic protocol generated through the default protocol.

According to a second aspect of the embodiments of the present application, another data exchange method is provided, wherein the method is applied to a receiver device performing data exchange with a sender device, the method comprising: negotiating a default protocol for the data exchange with the sender device; obtaining a dynamic protocol according to the default protocol; receiving an exchange data packet transmitted by the sender device, wherein the exchange data packet is a data packet generated by the sender device using the dynamic protocol generated through the default protocol and to-be-transmitted data; and processing the exchange data packet according to the dynamic protocol.

According to a third aspect of the embodiments of the present application, a data exchange apparatus is provided, wherein the apparatus is applied to a sender device performing data exchange with a receiver device, the apparatus comprising: a negotiation unit, configured to negotiate a default protocol for the data exchange with the receiver device; an obtaining unit, configured to obtain a dynamic protocol according to the default protocol; a generation unit, configured to generate an exchange data packet according to the dynamic protocol and to-be-transmitted data; and a transmission unit, configured to transmit the exchange data packet to the receiver device, so that the receiver device receives the exchange data packet using the dynamic protocol generated through the default protocol.

According to a fourth aspect of the embodiments of the present application, another data exchange apparatus is provided, wherein the apparatus is applied to a receiver device performing data exchange with a sender device, the apparatus comprising: a negotiation unit, configured to negotiate a default protocol for the data exchange with the sender device; an obtaining unit, configured to obtain a dynamic protocol according to the default protocol; a receiving unit, configured to receive an exchange data packet transmitted by the sender device, wherein the exchange data packet is a data packet generated by the sender device using the dynamic protocol generated through the default protocol and to-be-transmitted data; and a processing unit, configured to process the exchange data packet according to the dynamic protocol.

According to a fifth aspect of the embodiments of the present application, a data exchange device is provided, wherein the device is a sender device performing data exchange with a receiver device, the device comprising: a processor; and a storage configured to store executable instructions of the processor, wherein the processor is configured to: negotiate a default protocol for the data exchange with the receiver device; obtain a dynamic protocol according to the default protocol; generate an exchange data packet according to the dynamic protocol and to-be-transmitted data; and transmit the exchange data packet to the receiver device, so that the receiver device receives the exchange data packet using the dynamic protocol generated through the default protocol.

According to a sixth aspect of the embodiments of the present application, another data exchange device is provided, wherein the device is a receiver device performing data exchange with a sender device, the device comprising: a processor; and a storage configured to store executable instructions of the processor, wherein the processor is configured to: negotiate a default protocol for the data exchange with the sender device; obtain a dynamic protocol according to the default protocol; receive an exchange data packet transmitted by the sender device, wherein the exchange data packet is a data packet generated by the sender device using the dynamic protocol generated through the default protocol and to-be-transmitted data; and process the exchange data packet according to the dynamic protocol.

During data exchange in the disclosed embodiments, after a sender device and a receiver device negotiate a default protocol for the data exchange, a dynamic protocol is obtained according to the default protocol; the sender device generates an exchange data packet according to the dynamic protocol and to-be-transmitted data, and transmits the exchange data packet to the receiver device; the receiver device processes the exchange data packet according to the dynamic protocol so as to complete the data exchange. By means of the disclosed embodiments, a dynamic protocol is generated through a negotiated default protocol between a sender and a receiver; and data exchange is performed based on the dynamic protocol. Because the dynamic protocol can be dynamically generated when a need for data exchange arises, a malicious third party stealing can be effectively prevented in a communication process of data exchange, thereby enhancing data exchange security.

It should be understood that the general description above and the detailed description below are only exemplary and explanatory, and cannot limit the disclosed embodiments.

BRIEF DESCRIPTION OF THE DRAWINGS

The accompanying drawings here are incorporated into the specification and constitute a part thereof to illustrate the disclosed embodiments. The drawings are used together with the specification to explain the principles of the disclosed embodiments.

DETAILED DESCRIPTION

The terms used in the disclosure are for the purpose of describing particular embodiments only and are not intended to limit the disclosure. The singular forms "a", "an" and "the" used in the disclosure and the appended claims are also intended to include plural forms, unless the context clearly indicates otherwise. It should also be understood that the term "and/or" as used herein refers to and encompasses any or all possible combinations of one or more of the associated listed items.

It should be understood that although various types of information may be described using terms such as first, second, and third in the disclosure, such information should not be limited by these terms. These terms are only used to distinguish one type of information from another type of information. For example, first information may also be referred to as second information; similarly, second information may also be referred to as first information without departing from the scope of the disclosure. Depending on the context, the word "if" as used herein may be construed to mean "when" or "upon" or "in response to determining".

With the coming of the big data era, service servers deployed by Internet enterprises generate massive service data when the Internet enterprises carry out various services. Because of service collaboration among different enterprises, the need for data exchange may arise among service servers deployed by these enterprises. These service servers will then be able to exchange respective service data to improve respective services to the greatest extent. For example, a service server deployed by an enterprise A obtains a large amount of service risk data; and a service server deployed by an enterprise B obtains a large amount of user social data. The service servers of the two enterprises may then perform data exchange; enterprise A will learn about the communication methods of risky users through the user social data obtained from the exchange; enterprise B will then be able to avoid risky users during service promotion through the service risk data obtained from the exchange. However, data exchange between service servers has a low security level in current systems. In the disclosed embodiments, a dynamic protocol is generated through a negotiated default protocol between a sender and a receiver for data exchange; and data exchange is performed based on the dynamic protocol. As a result, a malicious third party stealing can be effectively prevented in a communication process of data exchange, thereby enhancing data exchange security. Below, the embodiments are described in detail with reference to specific embodiments.

Figure 1:
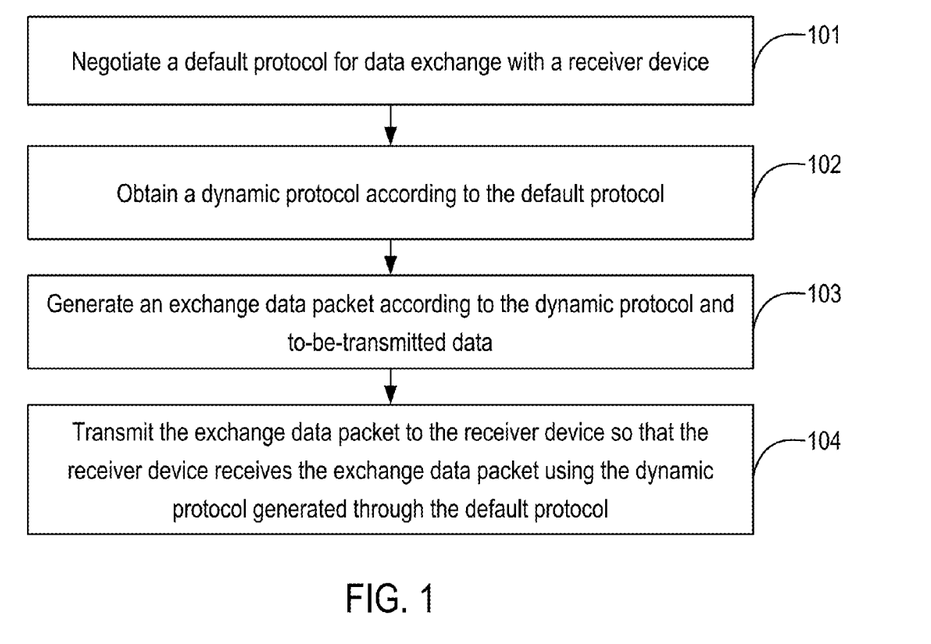
FIG. 1 is a flow diagram illustrating a data exchange method according to some embodiments of the disclosure.

FIG. 1 is a flow diagram illustrating a data exchange method according to some embodiments of the disclosure. This illustrated embodiment is described from the perspective of a sender device performing data exchange with a receiver device, including the following steps.

Step 101: Negotiate a default protocol for data exchange with a receiver device.

In this embodiment, a sender device may negotiate a key for data exchange while negotiating a default protocol for data exchange with the receiver device.

The sender device and the receiver device may separately sign into a trusted server to obtain the default protocol and key. The trusted server is operated by a trusted third party and is configured to provide a default protocol and key to both parties performing data exchange. After obtaining a default protocol and key, the sender device may write the default protocol and key into a subscriber identity module (SIM) card through a serial port. During negotiation of a default protocol and key with the receiver device, the sender device may read, through the serial port, a default protocol and key obtained from the trusted server; and the sender device may then determine, through a handshake protocol, to use the same default protocol and key to perform data exchange with the receiver device.

Step 102: Obtain a dynamic protocol according to the default protocol.

In this embodiment, the sender device may obtain the dynamic protocol by communicating with a preset dynamic protocol generator in any of the following manners.

In a first embodiment, the dynamic protocol is indirectly generated by the sender device. Specifically, the sender device may send a registration request for data exchange to the dynamic protocol generator, which then generates a random protocol code for the data exchange based on the registration request; the dynamic protocol generator sends the random protocol code to the sender device; the sender device then performs bitwise binary operations on the random protocol code and the default protocol determined through negotiation to obtain the dynamic protocol.

In a second embodiment, the dynamic protocol is generated indirectly by the dynamic protocol generator. Specifically, the sender device may send a registration request for data exchange to the dynamic protocol generator, wherein the registration request may carry the default protocol determined through negotiation; the dynamic protocol generator generates a random protocol code for the data exchange based on the registration request; the dynamic protocol generator then performs bitwise binary operations on the random protocol code and the default protocol carried in the registration request to obtain the dynamic protocol; and sends the dynamic protocol to the sender device.

Step 103: Generate an exchange data packet according to the dynamic protocol and to-be-transmitted data.

In this embodiment, when the sender device and the receiver device have negotiated a key, the sender device may encrypt to-be-transmitted data with the key to obtain encrypted data; and then an exchange data packet is generated according to the obtained dynamic protocol and the encrypted data. Optionally, when the to-be-transmitted data is larger than a pre-determined threshold, the encrypted data may be further compressed to obtain encrypted compressed data. The exchange data packet is then generated according to the obtained dynamic protocol and the encrypted compressed data.

In this embodiment, when the exchange data packet is being generated, the sender device may invoke a preset data packet format that includes a packet header and a packet body; and then the sender device may write the obtained dynamic protocol into a packet header of the exchange data packet according to a preset packet header format, and write the to-be-transmitted data into a packet body of the exchange data packet according to a preset packet body format. When the to-be-transmitted data is encrypted to obtain encrypted data, the encrypted data may be written into the packet body of the exchange data packet according to the preset packet body format; and when the encrypted data is further compressed to obtain encrypted compressed data, the encrypted compressed data may be written into the packet body of the exchange data packet according to the preset packet body format.

The packet header format may include: a protocol name of the dynamic protocol, and the order of the to-be-transmitted data in all data to be exchanged in the data exchange.

The packet body format may include: N (where N is a natural number greater than 1) data sub-packets derived from dividing the to-be-transmitted data, wherein a sub-packet format of each of the data sub-packets comprises a sub-packet length and sub-packet data. A data format of each piece of sub-packet data may include a bitmap index and M (where M is a natural number greater than 1) sub-data fields derived by dividing the sub-packet data, wherein the bitmap index comprises a sub-data field length for each sub-data in the M sub-data fields and a start position of each sub-data field in the sub-packet data to which the sub-data field belongs.

Step 104: Transmit the exchange data packet to the receiver device so that the receiver device receives the exchange data packet using the dynamic protocol generated through the default protocol.

It can be seen from the preceding embodiments that a dynamic protocol is generated through a negotiated default protocol between a sender and a receiver; and data exchange is performed based on the dynamic protocol. Because the dynamic protocol can be dynamically generated when a need for data exchange arises, a malicious third party stealing can be effectively prevented in a communication process of data exchange, thereby enhancing data exchange security.

Figure 2:
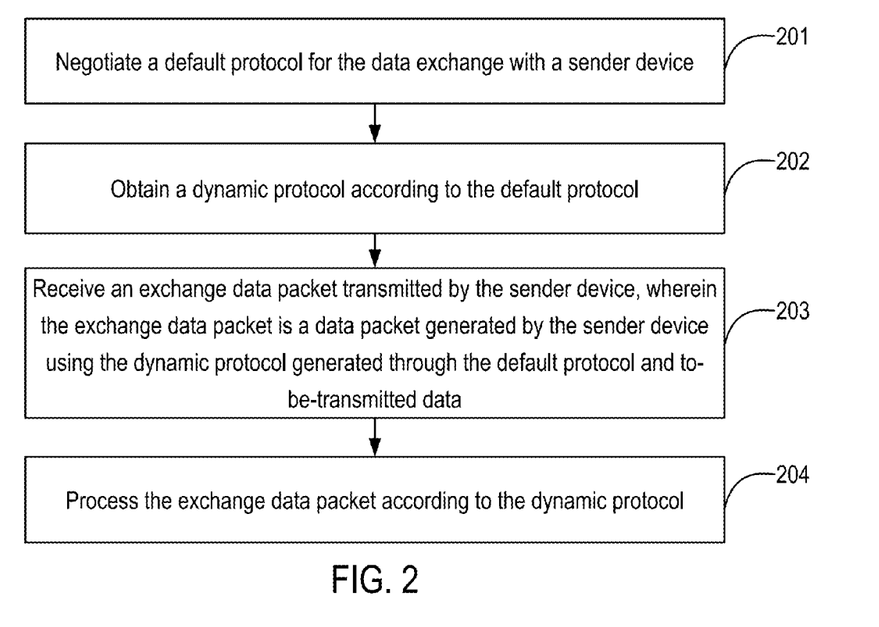
FIG. 2 is a flow diagram illustrating a data exchange method according to some embodiments of the disclosure.

FIG. 2 is a flow diagram illustrating a data exchange method according to some embodiments of the disclosure. The illustrated embodiment is described from the perspective of a receiver device performing data exchange with a sender device, including the following steps.

Step 201: Negotiate a default protocol for the data exchange with a sender device.

Step 202: Obtain a dynamic protocol according to the default protocol.

The process of negotiating a default protocol and obtaining a dynamic protocol indirectly by the receiver device described in step 201 and step 202 is consistent with the process described from the perspective of the sender device; they are therefore not described herein again but the disclosure of steps 201 and 202 is incorporated by reference in its entirety.

Step 203: Receive an exchange data packet transmitted by the sender device, wherein the exchange data packet is a data packet generated by the sender device using the dynamic protocol generated through the default protocol and to-be-transmitted data.

Step 204: Process the exchange data packet according to the dynamic protocol.

In this embodiment, the receiver device may invoke a preset data packet format to parse the received exchange data packet so as to acquire a protocol carried in the exchange data packet. The preset data packet format invoked by the receiver device is consistent with the data packet format invoked by the sender device in the embodiment shown in FIG. 1. Details will not be provided herein again but are incorporated herein by reference. Based on the data packet format, the receiver device may acquire a protocol from a packet header of the exchange data packet; and determine whether the protocol carried in the exchange data packet is the same as the obtained dynamic protocol. If they are the same, the receiver device may acquire the to-be-transmitted data from a packet body of the exchange data packet. When the packet body carries encrypted data obtained by the sender device encrypting the to-be-transmitted data with a negotiated key, after acquiring the encrypted data from the packet body, the receiver device may decrypt the encrypted data with the negotiated key to obtain the to-be-transmitted data. Further, when the packet body carries encrypted compressed data obtained by the sender device compressing the encrypted data, after acquiring the encrypted compressed data, the receiver device may first decompress the encrypted compressed data to obtain the encrypted data; and then decrypt the encrypted data with the negotiated key to obtain the to-be-transmitted data.

It can be seen from the preceding embodiments that a dynamic protocol is generated through a negotiated default protocol between a sender and a receiver; and data exchange is performed based on the dynamic protocol. Because the dynamic protocol can be dynamically generated when a need for data exchange arises, a malicious third party stealing can be effectively prevented in a communication process of data exchange, thereby enhancing data exchange security.

Figure 3:
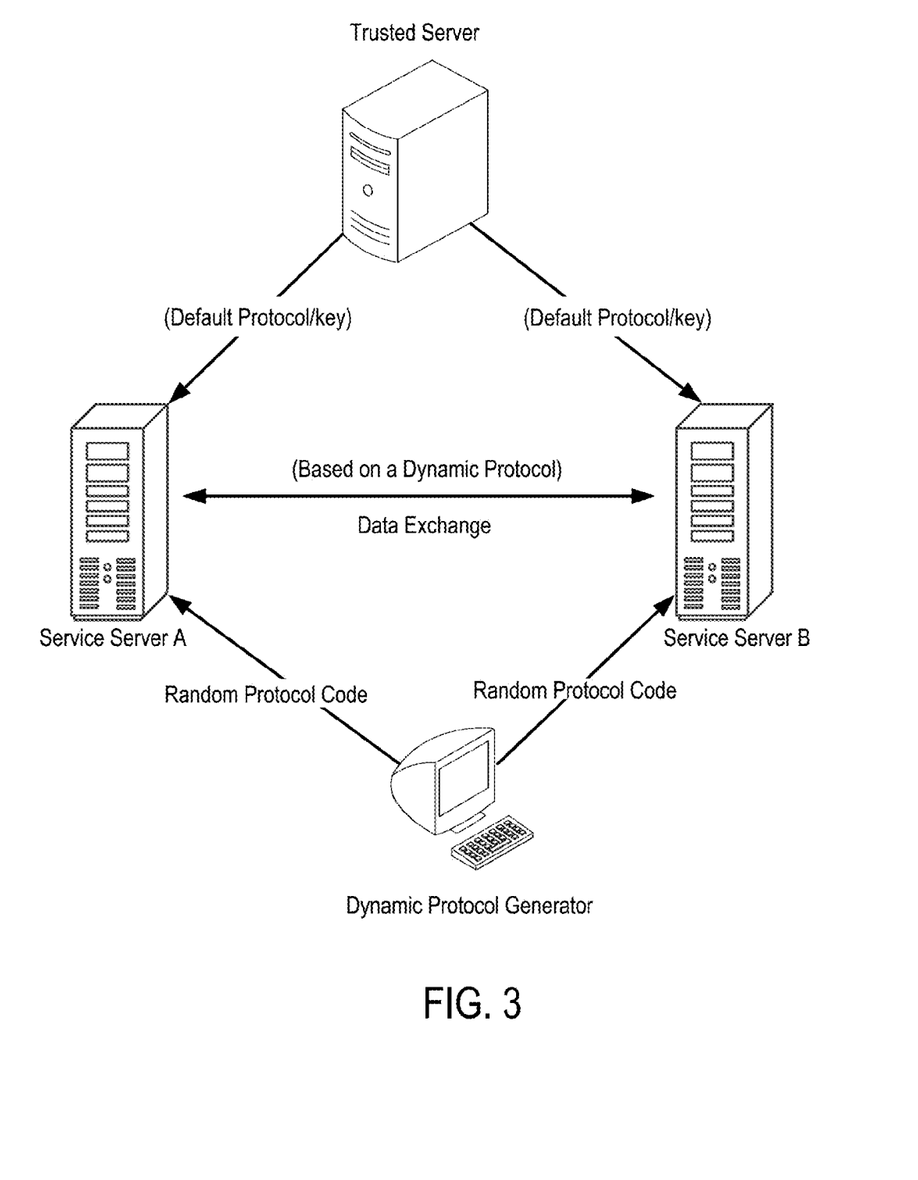
FIG. 3 is an interaction diagram illustrating a data exchange procedure in a network system according to some embodiments of the disclosure.

FIG. 3 is an interaction diagram illustrating a data exchange procedure in a network system according to some embodiments of the disclosure.

The interaction diagram shown in FIG. 3 includes: a service server A as a sender device; a service server B as a receiver device; a trusted server set by a trusted third party and is configured to provide a default protocol and a key; and a dynamic protocol generator configured to provide a random protocol code. Based on the interactions shown in FIG. 3, when data exchange is to be performed between the service server A and the service server B, the service server A and the service server B may request a respective default protocol and key from the trusted server; the trusted server may provide a default protocol and key for this data exchange to both parties performing data exchange; and after the service server A and the service server B determine, through negotiation, a default protocol and key to be used, they each communicate with the dynamic protocol generator and generate a dynamic protocol according to the default protocol. The data exchange will then be completed using the dynamic protocol and the key.

Figure 4A:
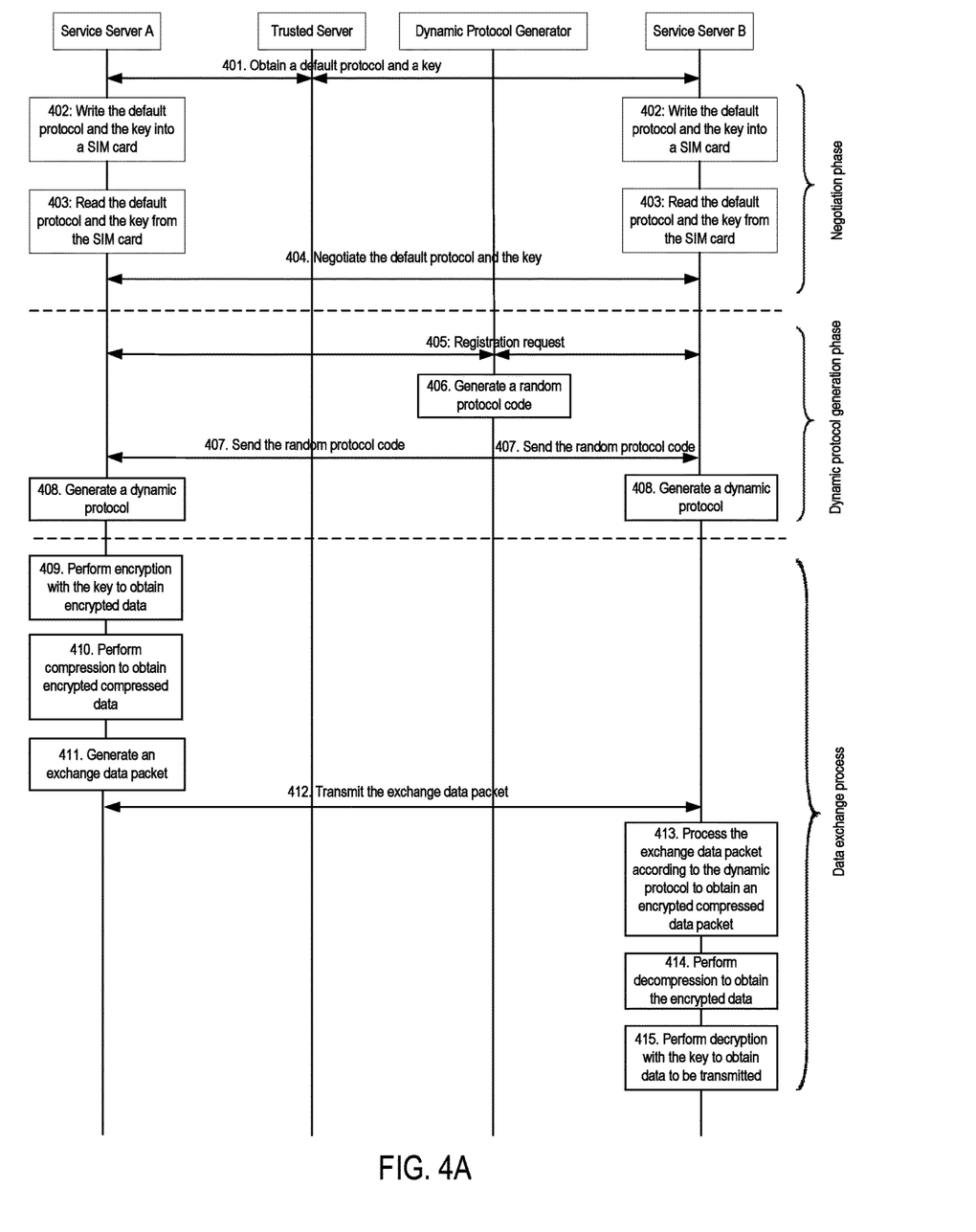
FIG. 4A is a flow diagram illustrating a data exchange method in a network system according to some embodiments of the disclosure.

FIG. 4A is a flow diagram illustrating a data exchange method in a network system according to some embodiments of the disclosure. The illustrated embodiment describes in detail the data exchange process between the service server A and the service server B with reference to the scenario discussed in connection with FIG. 3, and includes the following steps:

Step 401: The service server A and the service server B sign into the trusted server to obtain a default protocol and key for this data exchange.

When a need for data exchange between the service server A and the service server B arises, in order to ensure the security of data exchange, the service server A and the service server B may sign into the trusted server respectively; the trusted server allocates, to the service server A and the service server B, a default protocol and key for this data exchange. The service server A and the service server may provide an exchange identifier for this data exchange upon sign-in; the trusted server then allocates, according to the exchange identifier, the same default protocol and key to the service server A and the service server B performing this data exchange.

Step 402: The service server A and the service server B write the obtained default protocol and the key into a respective SIM card through a serial port.

In this embodiment, the service server A and the service server B are provided with a SIM card respectively for saving the default protocol and the key. The default protocol and the key may be written into the SIM card in a byte-by-byte fashion according to their information through the serial port; information may also be read from the SIM card in a byte-by-byte fashion afterwards.

Step 403: When data exchange is to be performed between the service server A and the service server B, each server reads the default protocol and the key from a respective SIM card through the serial port.

Step 404: The service server A and the service server B negotiate through a handshake protocol to determine the default protocol and the key for data exchange. In this embodiment, if the service server A and the service server B only save one set of default protocol and key issued by the trusted server, then the service server A and the service server B negotiate through a handshake protocol and determine to use this set of default protocol and key to perform data exchange; if the service server A and the service server B save multiple sets of default protocols and keys issued by the trusted server, then the service server A and the service server B may negotiate through a handshake protocol to determine, from the multiple sets of default protocols and keys, one set of default protocol and key used for performing data exchange.

Step 405: The service server A and the service server B send a respective registration request of this data exchange to the dynamic protocol generator.

In this embodiment, the dynamic protocol generator is configured to generate a random protocol code for both parties performing data exchange. After the service server A and the service server B determine the default protocol and key through negotiation, each server sends a registration request of this data exchange to the dynamic protocol generator, wherein the registration request may contain an exchange identifier of this data exchange. The dynamic protocol generator can then generate a random protocol code for this data exchange according to the exchange identifier; that is, the same random protocol code is generated for the service server A and the service server B.

Step 406: The dynamic protocol generator generates a random protocol code for this data exchange according to the registration request.

Step 407: The dynamic protocol generator sends the random protocol code to both the service server A and the service server B.

Step 408: The service server A and the service server B each perform bitwise binary operations on the random protocol code and the negotiated default protocol to obtain a dynamic protocol.

In this step, after obtaining the same random protocol code, the service server A and the service server B performing data exchange may perform bitwise binary operations on the random protocol code and the default protocol determined through negotiation to obtain a dynamic protocol. The number of bytes of the random protocol code is the same as the number of bytes of the default protocol. A dynamic protocol of the same number of bytes can be obtained after a binary operation is performed on the random protocol code and the default protocol.

Figure 4B:
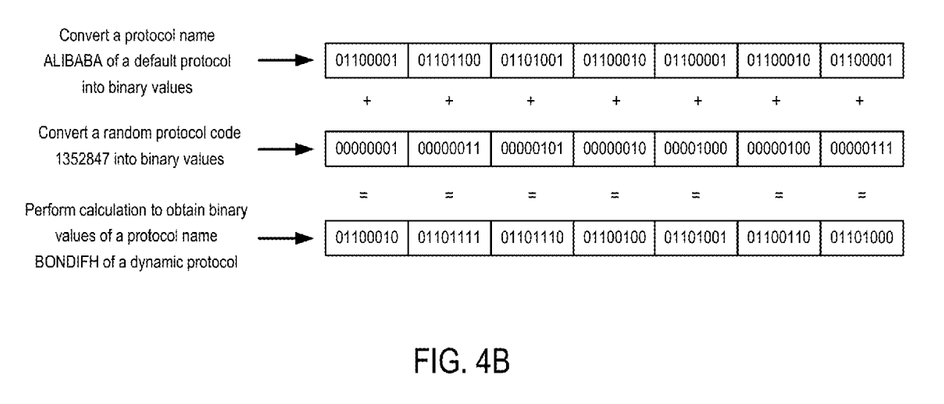
FIG. 4B is a diagram illustrating a process of generating a dynamic protocol according to a default protocol shown in FIG. 4A.

FIG. 4B is a diagram illustrating a process of generating a dynamic protocol according to a default protocol shown in FIG. 4A.

Assuming that the default protocol is "ALIBABA" of seven bytes and the random protocol code is "1352847" of seven bytes; then each byte in "ALIBABA" and "1352847" is converted into an 8-bit binary value. Afterwards, binary values at symmetrical byte positions are added, and each binary value after addition is converted into seven bytes "BONDIFH" that forms the dynamic protocol.

Step 409: The service server A encrypts to-be-transmitted data with the negotiated key to obtain encrypted data.

In this step, the key may be a key for encrypting data with a symmetrical encryption method, where the symmetrical encryption method may specifically be a data encryption algorithm (DEA) encryption method; then the trusted server may allocate a key for DEA encryption to the service server A and the service server B. For example, the key may have 8 bytes with the final bit position of the final byte a parity bit. Encryption using a DEA encryption may comprise using a variety of symmetrical or DEA encryption algorithms, the details of each are not described herein.

Step 410: The service server A compresses the encrypted data to obtain encrypted compressed data. In this embodiment, the service server A and the service server B may use different compression and decompression methods depending on various platforms they support. For example, a ZIP method may be used for a WINDOWS platform; a GZIP method may be used for a LINUX platform, and so on. The compression and decompression methods should not be limited in this embodiment.

Step 411: The service server A generates an exchange data packet according to the obtained dynamic protocol and the encrypted compressed data.

In this step, after obtaining an encrypted compressed data packet, the service server A may invoke a preset data packet format that includes a packet header and a packet body; and then the sender device may write the dynamic protocol into a packet header of the exchange data packet according to a preset packet header format, and write the to-be-transmitted data into a packet body of the exchange data packet according to a preset packet body format.

Figure 4C:
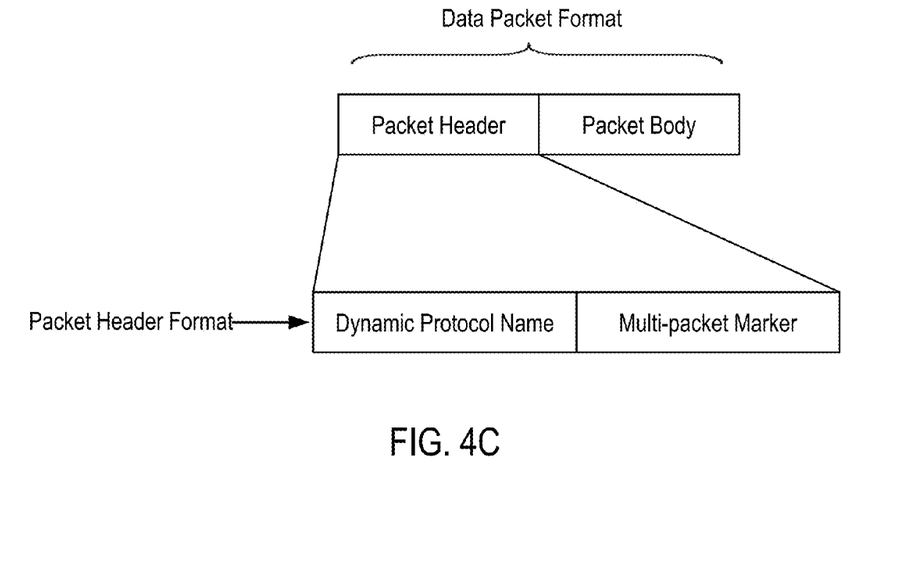
FIG. 4C is a diagram of a packet header format of an exchange data packet shown in FIG. 4A.

FIG. 4C is a diagram of a packet header format of an exchange data packet shown in FIG. 4A.

The packet header format in FIG. 4C may include: a dynamic protocol name field for writing a protocol name of a dynamic protocol generated on the service server A therein; and a multi-packet marker field for writing the order of to-be-transmitted data in all data to be exchanged in this data exchange therein. For example, 100 data packets need to be transmitted in this data exchange; and the 50th data packet is currently transmitted; then "50" may be written into the multi-packet marker field.

Figure 4D:
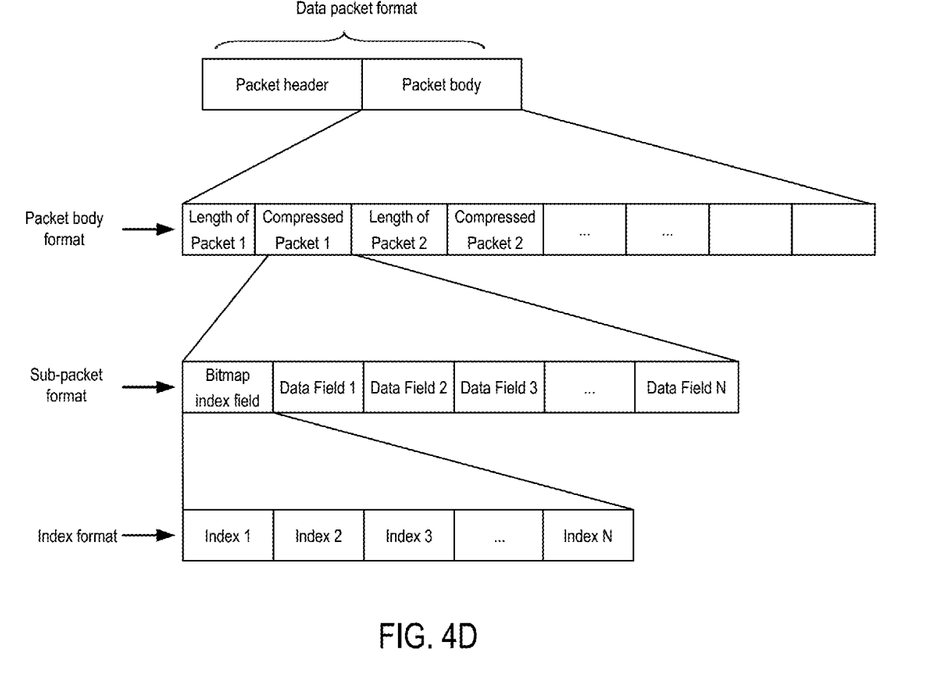
FIG. 4D is a diagram of a packet body format of an exchange data packet shown in FIG. 4A.

FIG. 4D is a diagram of a packet body format of an exchange data packet shown in FIG. 4A.

The packet body format in FIG. 4D may include: N (where N is a natural number greater than 1) data sub-packets derived from dividing the encrypted compressed data, wherein a sub-packet format of each of the data sub-packet includes a sub-packet length and sub-packet data. As shown in FIG. 4D, using the first data sub-packet as an example, a sub-packet length of the first data sub-packet is represented as "Length of Packet 1", and sub-packet data of the first data sub-packet is "Compressed Packet 1". A data format of each piece of sub-packet data includes a bitmap index and N sub-data fields derived by dividing the sub-packet data, wherein the bitmap index includes N indexes; each index corresponds to one sub-data field; each index may be formed by two bytes, with one byte representing a length of the corresponding sub-data field, and the other byte representing a start position of the corresponding sub-data field in the sub-packet data to which the sub-data field belongs. In this embodiment, N is a natural number greater than 1. For example, N may be 64 or 128.

Step 412: The service server A transmits the exchange data packet to the service server B.

Step 413: The service server B processes the received exchange data packet according to the obtained dynamic protocol to obtain an encrypted compressed data packet.

After receiving an exchange data packet, the service server may invoke a preset data packet format to parse the exchange data packet. The preset data packet format in this step is consistent with the data packet format described in step 411 in which the data packet format is invoked by the service server A when generating the exchange data packet. After parsing the exchange data packet, the service server B may acquire a protocol carried in the exchange data packet from a packet header; and then determine whether the protocol is the same as the dynamic protocol generated by the service server B. If they are the same, the service server B may acquire encrypted compressed data from a packet body.

Step 414: The service server B decompresses encrypted compressed data to obtain the encrypted data.

Step 415: The service server B decrypts the encrypted data with the negotiated key to obtain the to-be-transmitted data.

After the service server A and the service server B complete the data exchange based on the aforementioned flow, the service server A and the service server B may send a deregistration request to the dynamic protocol generator respectively. The dynamic protocol generator can then delete the random protocol code generated for this data exchange, thereby completing its own state update.

It can be seen from the aforementioned embodiments that a dynamic protocol is generated through a negotiated default protocol between a sender and a receiver; and data exchange is performed based on the dynamic protocol. Because the dynamic protocol can be dynamically generated when a need for data exchange arises, a malicious third party stealing can be effectively prevented in a communication process of data exchange, thereby enhancing data exchange security. When to-be-transmitted data is encrypted with a key negotiated by the sender and the receiver for transmission, the security level of data exchange can be further strengthened. Compressing the encrypted data for transmission also saves transmission resources during data exchange.

In accordance with the embodiments of the data exchange method, the disclosure further provides embodiments of a data exchange apparatus and device.

Figure 5:
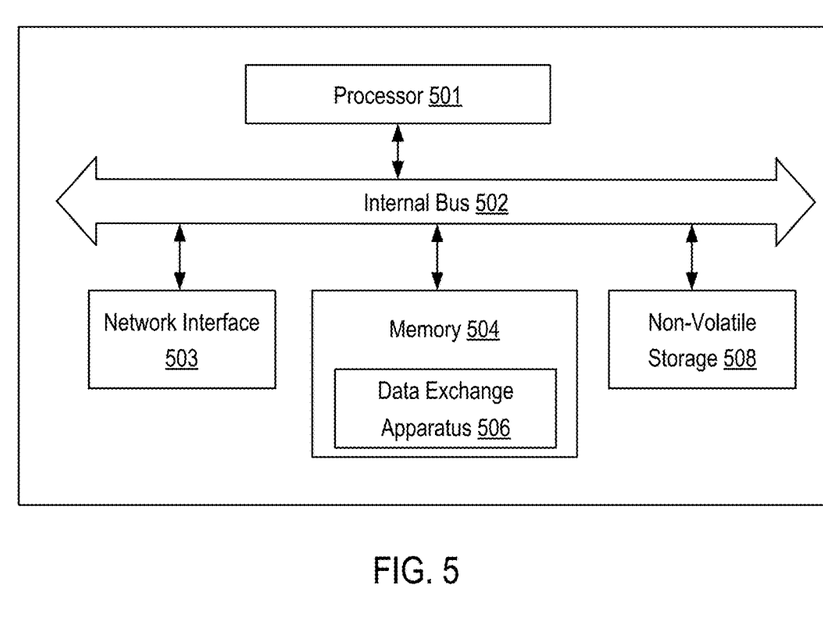
FIG. 5 is a hardware diagram illustrating a device where a data exchange apparatus is located according to some embodiments of the disclosure.

Embodiments of the data exchange apparatus in the disclosure may be applied to a sender device or a receiver device for performing data exchange. The apparatus embodiments may be implemented by software; or may be implemented by hardware or a combination of software and hardware. A software implementation may be an apparatus in a logical sense and is used as an example. The apparatus is formed by reading corresponding computer program instructions in a non-volatile storage into a memory for running through a processor of a device where the apparatus is located. On the hardware level, as shown in FIG. 5, it is a hardware structural diagram of a device where the data exchange apparatus 506 of the present disclosure is located. In addition to the processor 501, the memory 504, the network interface 503, and the non-volatile storage 508 shown in FIG. 5 (connected by bus 502), the device where the apparatus in the embodiment is located may further include, according to the actual function of the device, other hardware, which will not be shown in detail in FIG. 5.

Figure 6:
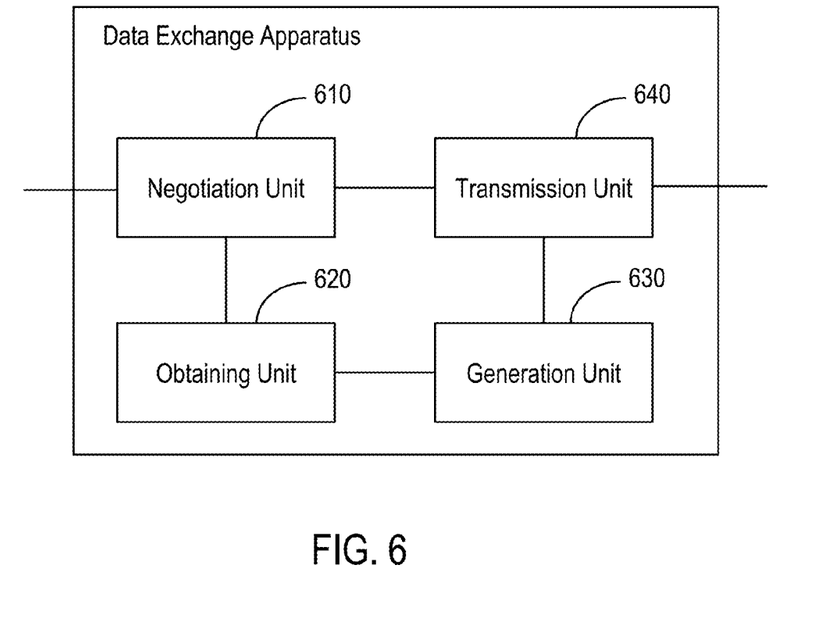
FIG. 6 is a block diagram illustrating a data exchange apparatus according to some embodiments of the disclosure.

FIG. 6 is a block diagram illustrating a data exchange apparatus according to some embodiments of the disclosure. The apparatus may be applied to a sender device performing data exchange with a receiver device. The apparatus includes: a negotiation unit 610, an obtaining unit 620, a generation unit 630, and a transmission unit 640.

The negotiation unit 610 is configured to negotiate a default protocol for the data exchange with the receiver device.

The obtaining unit 620 is configured to obtain a dynamic protocol according to the default protocol.

The generation unit 630 is configured to generate an exchange data packet according to the dynamic protocol and to-be-transmitted data.

The transmission unit 640 is configured to transmit the exchange data packet to the receiver device, so that the receiver device receives the exchange data packet using the dynamic protocol generated through the default protocol.

In one embodiment, the negotiation unit 610 is further configured to negotiate a key for the data exchange while negotiating the default protocol for the data exchange with the receiver device; and the generation unit 630 may include (not shown in FIG. 6): a data encryption subunit, configured to encrypt the to-be-transmitted data with the key to obtain encrypted data; and a data packet generation subunit, configured to generate the exchange data packet according to the dynamic protocol and the encrypted data.

In another embodiment, the generation unit 630 may further include (not shown in FIG. 6): a data compression subunit, configured to compress the encrypted data to obtain encrypted compressed data; and accordingly, the data packet generation subunit may be specifically configured to generate the exchange data packet according to the dynamic protocol and the encrypted compressed data.

In another embodiment, the apparatus may further include (not shown in FIG. 6): a sign-in unit, configured to, prior to the negotiation unit negotiating the default protocol and the key for the data exchange with the receiver device, sign into a trusted server to obtain the default protocol and the key when it is determined to perform the data exchange with the receiver device; and a writing unit, configured to write the default protocol and the key into a subscriber identity module (SIM) card through a serial port. In one embodiment, the negotiation unit 610 may include (not shown in FIG. 6) a SIM card reading subunit, configured to read the default protocol and the key from the SIM card through the serial port; and a handshake negotiation subunit, configured to determine, through a handshake protocol, that the default protocol and the key are used in performing the data exchange with the receiver device.

In another embodiment, the obtaining unit 620 may include (not shown in FIG. 6): a first request sending subunit, configured to send, to a dynamic protocol generator, a registration request for the data exchange; a random protocol code receiving subunit, configured to receive a random protocol code generated by the dynamic protocol generator for the data exchange according to the registration request; and a dynamic protocol generation subunit, configured to perform bitwise binary operations on the random protocol code and the default protocol to obtain the dynamic protocol.

In another embodiment, the obtaining unit 620 may also include (not shown in FIG. 6): a second request sending subunit, configured to send, to a dynamic protocol generator, a registration request for the data exchange, wherein the registration request carries the default protocol, so that the dynamic protocol generator performs bitwise binary operations on a random protocol code generated for the data exchange and the default protocol to obtain the dynamic protocol; and a dynamic protocol receiving subunit, configured to receive the dynamic protocol generated by the dynamic protocol generator.

In another embodiment, the generation unit 630 may include (not shown in FIG. 6): a format invoking subunit, configured to invoke a preset data packet format, wherein the data packet format comprises a packet header and a packet body; and a data writing subunit, configured to write the dynamic protocol into a packet header of the exchange data packet according to a preset packet header format, and writing the to-be-transmitted data into a packet body of the exchange data packet according to a preset packet body format.

The packet header format may include: a protocol name of the dynamic protocol, and the order of the to-be-transmitted data in all data to be exchanged in the data exchange; and the packet body format may include: N data sub-packets derived from dividing the to-be-transmitted data, wherein a sub-packet format of each of the data sub-packets comprises a sub-packet length and sub-packet data, and N is a natural number greater than 1, wherein a data format of each of the sub-packet data comprises a bitmap index and M sub-data fields derived by dividing the sub-packet data, wherein the bitmap index comprises a sub-data field length for each sub-data in the M sub-data fields and a start position of each sub-data field in the sub-packet data, and M is a natural number greater than 1.

Figure 7:
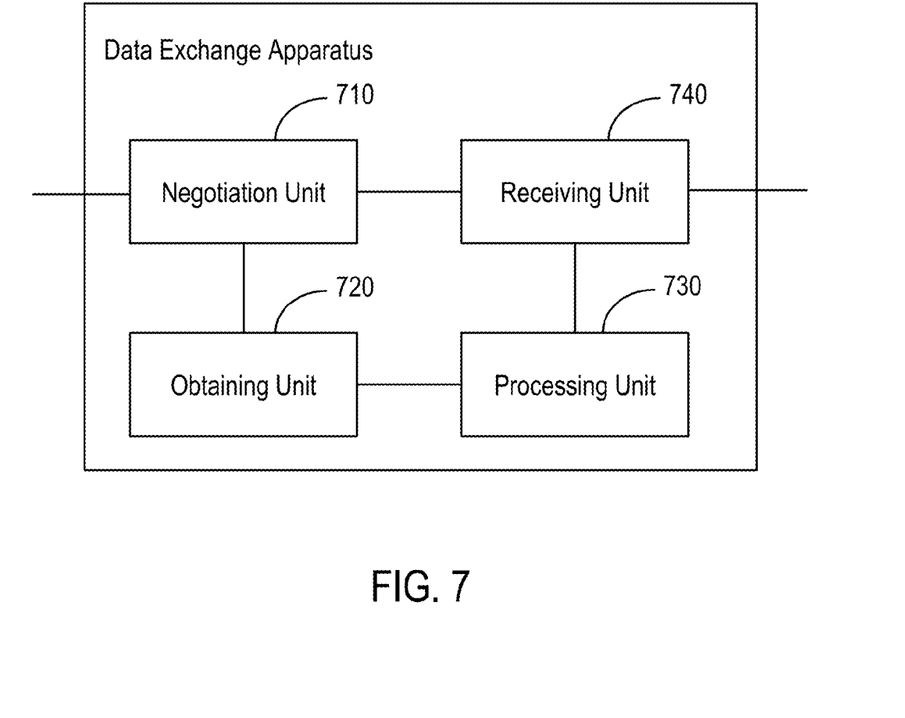
FIG. 7 is a block diagram illustrating a data exchange apparatus according to some embodiments of the disclosure.

FIG. 7 is a block diagram illustrating a data exchange apparatus according to some embodiments of the disclosure. The apparatus may be applied to a receiver device performing data exchange with a sender device. The apparatus includes: a negotiation unit 710, an obtaining unit 720, a receiving unit 730, and a processing unit 740.

The negotiation unit 710 is configured to negotiate a default protocol for the data exchange with the sender device.

The obtaining unit 720 is configured to obtain a dynamic protocol according to the default protocol.

The receiving unit 730 is configured to receive an exchange data packet transmitted by the sender device, wherein the exchange data packet is a data packet generated by the sender device using the dynamic protocol generated through the default protocol and to-be-transmitted data.

The processing unit 740 is configured to process the exchange data packet according to the dynamic protocol. In one embodiment: the negotiation unit 710 is further configured to negotiate a key for the data exchange while negotiating the default protocol for the data exchange with the sender device; and accordingly, the exchange data packet may specifically be: an exchange data packet generated according to the dynamic protocol and encrypted data, wherein the encrypted data is data obtained after encrypting the to-be-transmitted data with the key.

In another embodiment, the apparatus may further include (not shown in FIG. 7): a sign-in unit, configured to, prior to the negotiation unit negotiating the default protocol and the key for the data exchange with the sender device, sign into a trusted server to obtain the default protocol and the key when it is determined to perform the data exchange with the sender device; and a writing unit, configured to write the default protocol and the key into a SIM card through a serial port; and the negotiation unit 710 may include (not shown in FIG. 7): a SIM card reading subunit, configured to read the default protocol and the key from the SIM card through the serial port; and a handshake negotiation subunit, configured to determine, through a handshake protocol, that the default protocol and the key are used in performing the data exchange with the sender device.

In another embodiment, the obtaining unit 720 may include (not shown in FIG. 7): a first request sending subunit, configured to send, to a dynamic protocol generator, a registration request for the data exchange; a random protocol code receiving subunit, configured to receive a random protocol code generated by the dynamic protocol generator for the data exchange according to the registration request; and a dynamic protocol generation subunit, configured to perform bitwise binary operations on the random protocol code and the default protocol to obtain the dynamic protocol.

In another embodiment, the obtaining unit 720 may also include (not shown in FIG. 7): a second request sending subunit, configured to send, to a dynamic protocol generator, a registration request for the data exchange, wherein the registration request carries the default protocol, so that the dynamic protocol generator performs bitwise binary operations on a random protocol code generated for the data exchange and the default protocol to obtain the dynamic protocol; and a dynamic protocol receiving subunit, configured to receive the dynamic protocol generated by the dynamic protocol generator.

In another embodiment, the processing unit 740 may include (not shown in FIG. 7): a format invoking subunit, configured to invoke a preset data packet format to parse the exchange data packet so as to acquire a protocol carried in the exchange data packet; a protocol determining subunit, configured to determine whether the protocol carried in the exchange data packet is the same as the dynamic protocol; and a data acquisition subunit, configured to acquire the to-be-transmitted data from the exchange data packet if the protocol carried in the exchange data packet is the same as the dynamic protocol.

The preset data packet format may include a packet header and a packet body, wherein a packet header format of the packet header may include: a protocol name of the protocol carried in the exchange data packet, and the order of the to-be-transmitted data in all data to be exchanged in the data exchange; and a packet body format of the packet body may include: N data sub-packets derived from dividing the to-be-transmitted data, wherein a sub-packet format of each of the data sub-packets comprises a sub-packet length and sub-packet data, and N is a natural number greater than 1, wherein a data format of each of the sub-packet data comprises a bitmap index and M sub-data fields derived by dividing the sub-packet data, wherein the bitmap index comprises a sub-data field length for each sub-data in the M sub-data fields and a start position of each sub-data field in the sub-packet data, and M is a natural number greater than 1.

Details of the implementation processes of functions and effects of each of the units of the above apparatus can be seen by referring to the corresponding steps in the implementation processes of the method above, and are thus not repeated herein.

With regard to the apparatus embodiments, since the methods performed by apparatus embodiments are similar to the method embodiments, reference can be made to the description of the method embodiments for related parts. The apparatus embodiments described above are only exemplary. The units described as separate parts can be or are not physically separate, and the parts shown as units can be or are not physical units, and not only can be located in one place, but also can be distributed onto a plurality of network units. Part or all of the modules can be chosen to implement the goals of the disclosure according to actual requirements. A person of ordinary skill in the art can understand and implement the disclosed embodiments without making creative efforts.

It can be seen from the aforementioned embodiment that a dynamic protocol is generated through a negotiated default protocol between a sender and a receiver; and data exchange is performed based on the dynamic protocol. Because the dynamic protocol can be dynamically generated when a need for data exchange arises, a malicious third party stealing can be effectively prevented in a communication process of data exchange, thereby enhancing data exchange security.

A person skilled in the art can easily derive other implementations after considering the specification and practicing the embodiments disclosed herein. The disclosure is intended to cover any variations, uses, or adaptive changes of the disclosed embodiments. These variations, uses, or adaptive changes follow general principles of the disclosure and include common knowledge or conventional technical means in the art that are not disclosed in the disclosure. The specification and embodiments are considered exemplary only, and the true scope and spirit of the disclosure will be reflected by the following claims.

It should be understood that the disclosure is not limited to the precise structures that have been described above and illustrated in the accompanying drawings; and various modifications and changes can be made without departing from the scope of the present application.

The invention claimed is:

1. A method comprising:
negotiating, by a sender device with a trusted server, a default protocol for use with data exchanges between the sender device and a receiver device;
receiving, by the sender device, a random protocol code from a dynamic protocol generator;
generating, by the sender device, a dynamic protocol to replace the default protocol based on the default protocol and the random protocol code, the generating the dynamic protocol comprising performing a bitwise binary operation on the default protocol and the random protocol code to generate the dynamic protocol;
generating, by the sender device, an exchange data packet using the dynamic protocol and to-be-transmitted data; and
transmitting, by the sender device, the exchange data packet to the receiver device.

2. The method of claim 1, wherein negotiating the default protocol comprises:
receiving sign-in requests from the sender device and the receiver device; and
transmitting the default protocol and a key to the sender device and receiver device.

3. The method of claim 2, wherein the method further comprises storing the default protocol and key in a respective subscriber identity module (SIM) of the sender device.

4. The method of claim 1, wherein generating the dynamic protocol according to the default protocol further comprises:
receiving a registration request from the sender device;
generating a random protocol code in response to the registration request; and
transmitting the random protocol code to both the sender device and receiver device.

5. The method of claim 1, wherein generating an exchange data packet based on the dynamic protocol and to-be-transmitted data comprises encrypting the to-be-transmitted data and compressing the encrypted to-be-transmitted data if the to-be-transmitted data exceeds a predetermined threshold.

6. The method of claim 1, wherein generating an exchange data packet based on the dynamic protocol and to-be-transmitted data comprises invoking a preset data packet format, the preset data packet format comprising a packet header and a packet body.

7. The method of claim 6, wherein the packet header comprises a name of the dynamic protocol and a multipacket marker.

8. The method of claim 7, wherein the packet body comprises a plurality of sub-packets, each sub-packet datum including a bitmap index field and a plurality of data fields.

9. A device comprising:
a processor; and
a non-transitory memory storing computer-executable instructions therein that, when executed by the processor, cause the device to perform the operations of:
negotiating, with a trusted server, a default protocol for use with data exchanges with a receiver device, receiving a random protocol code from a dynamic protocol generator, generating a dynamic protocol to replace the default protocol based on the default protocol and the random protocol code, the generating the dynamic protocol comprising performing a bitwise binary operation on the default protocol and the random protocol code to generate the dynamic protocol, generating an exchange data packet using the dynamic protocol and to-be-transmitted data, and transmitting the exchange data packet to the receiver device.

10. The device of claim 8, wherein negotiating a default protocol for use with data exchanges with the receiver device comprises:

transmitting a sign-in request to the trusted server; and receiving the default protocol and a key from the trusted server.

11. The device of claim 10, wherein the operations further comprising storing the default protocol and key in a respective subscriber identity module (SIM) of the device.

12. The device of claim 8, wherein generating the dynamic protocol according to the default protocol further comprises:

receiving a registration request from the sender device;

generating a random protocol code in response to the registration request; and transmitting the random protocol code to both the device and the receiver device.

13. The device of claim 8, wherein generating an exchange data packet based on the dynamic protocol and to-be-transmitted data comprises encrypting the to-be-transmitted data and compressing the encrypted to-be-transmitted data if the to-be-transmitted data exceeds a predetermined threshold.

14. The device of claim 8, wherein generating an exchange data packet based on the dynamic protocol and to-be-transmitted data comprises invoking a preset data packet format, the preset data packet format comprising a packet header and a packet body.

15. The device of claim 14, wherein the packet header comprises a name of the dynamic protocol and a multi-packet marker.

16. The device of claim 15, wherein the packet body comprises a plurality of sub-packets, each sub-packet datum including a bitmap index field and a plurality of data fields.

17. A system comprising:

a trusted server configured to negotiate a default protocol for use with data exchanges;

a dynamic protocol generator configured to generate a random protocol code; and a sender device and a receiver device, wherein the sender device is configured to:

request and receive the random protocol code from the dynamic protocol generator, generate a dynamic protocol to replace the default protocol based on the default protocol and the random protocol code, the generating the dynamic protocol comprising performing a bitwise binary operation on the default protocol and the random protocol code to generate the dynamic protocol, generate an exchange data packet using the dynamic protocol and to-be-transmitted data, and transmit the exchange data packet to the receiver device.

18. The system of claim 17, wherein the sender device is further configured to encrypt the to-be-transmitted data prior to generating the exchange data packet and compress the exchange data packet prior to transmission, and wherein the receiving device is configured to:

receive the exchange data packet;

process the exchange data packet based on the dynamic protocol to obtain the to-be-transmitted data;

decompress the exchange data packet; and decrypt the exchange data packet using a negotiated key, the negotiated key transmitted to the sender device and receiver device as part of negotiating the default protocol.

* * * * *